United States Patent

Smoll

[11] 4,195,515
[45] Apr. 1, 1980

[54] IN LINE ELECTROMAGNETIC FLOW MEASUREMENT TRANSDUCER

[76] Inventor: Owen C. Smoll, 635 Baker St., Apt. 202, Costa Mesa, Calif. 92626

[21] Appl. No.: 863,706

[22] Filed: Dec. 23, 1977

Related U.S. Application Data

[63] Continuation-in-part of Ser. No. 700,176, Jun. 28, 1976, abandoned.

[51] Int. Cl.² .................................................. G01F 1/58
[52] U.S. Cl. .................................................. 73/194 EM
[58] Field of Search .................................... 73/194 EM

[56] References Cited

U.S. PATENT DOCUMENTS

| | | | |
|---|---|---|---|
| 2,734,380 | 2/1956 | Mittelmann | 73/194 EM |
| 2,766,621 | 10/1956 | Raynsford et al. | 73/194 EM |
| 3,002,379 | 10/1961 | Hurley | 73/194 EM X |
| 3,034,002 | 5/1962 | Carlson, Jr. | 73/194 EM X |
| 3,504,541 | 4/1970 | Birnstingl | 73/194 EM |

*Primary Examiner*—Charles A. Ruehl
*Attorney, Agent, or Firm*—Fulwider, Patton, Rieber, Lee & Utecht

[57] ABSTRACT

An electromagnetic type fluid flow meter for measurements of conductive fluids which utilizes an interchangeable disposable electrode sensor assembly with a common magnetic drive assembly. The electrode sensor assembly includes a tubular member adapted to be connected into a flow line and which includes sensor electrodes and an electrical connector for providing external electrical connections to electrodes. An electromagnetic assembly includes a C-shaped magnetic core and a winding on the core. Parallel guide members on the electromagnetic assembly receive mating guides on either side of the tubular member in sliding engagement to hold the tubular member between the poles of the magnet with the electrodes properly oriented with respect to the flux lines. The electromagnetic assembly includes an electrical connector which engages the connector on the tubular member when it is inserted in the guides.

28 Claims, 10 Drawing Figures

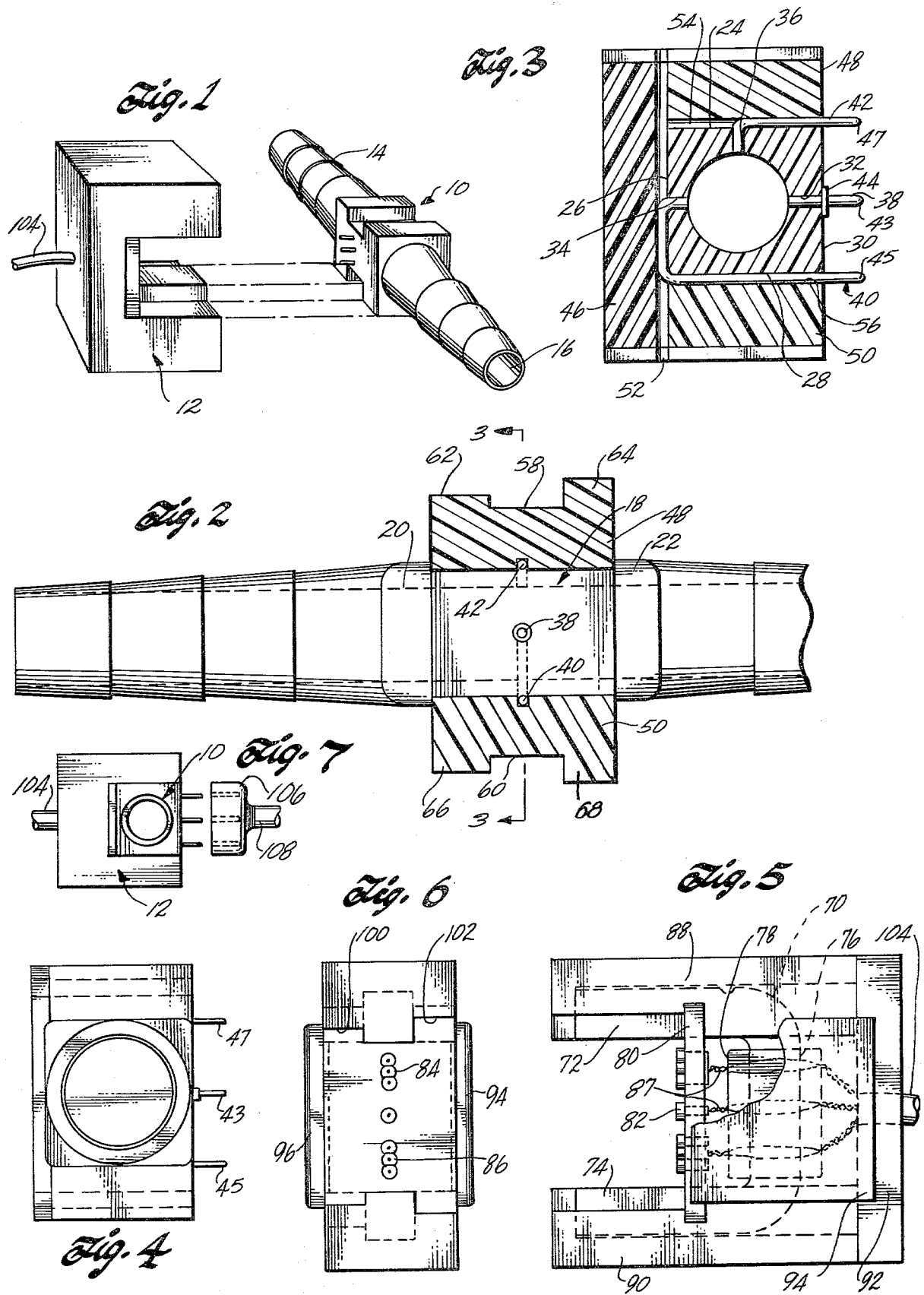

+ FLOW INTO PAPER
A+B ADDITIVE

A−B DIFFERENTIAL

IN LINE ELECTROMAGNETIC FLOW MEASUREMENT TRANSDUCER

CROSS REFERENCE TO RELATED APPLICATION

This application is a continuation-in-part of application Ser. No. 700,176, filed June 28, 1976, now abandoned.

FIELD OF THE INVENTION

This invention relates to electromagnetic flow meters, and more specifically relates to apparatus used in the extracorporeal measurement of blood flow or other conductive liquids.

BACKGROUND OF THE INVENTION

The use of an electromagnetic flow meter to measure blood flow is well known. The basic concept, for example, is described in U.S. Pat. No. 2,149,847. By passing blood, either in a tube or blood vessel oriented at right angles to a magnetic field, an EMF is produced in a direction mutually perpendicular to the magnetic field and the direction of blood flow, since the blood has the property of a moving conductor cutting through a magnetic field. The voltage generated is proportional to the velocity of flow and therefore directly proportional to the volume rate of flow of the fluid. The voltage can be measured by electrodes positioned at diametrically opposite points of the tube along a diameter extending perpendicular to the magnetic lines of the flux.

Because the electrodes, magnet structure, and fluid passage must be maintained in fixed predetermined relationship in order to maintain accurate calibration of the flow measurement, it has been the practice heretofore to assembly the tube, electrodes, and magnet structure as a unit and direct flow of blood or other conductive fluid through the tubular section in making flow measurements. Such unitary structure has several disadvantages in extracorporeal use. First, it is difficult to sterilize effectively after use. Also different size units must be provided to accommodate measurement in different size flow lines. Where measurements are to be taken at more than one point in an extracorporeal circuit, a plurality of separate complete flow meter units are required.

SUMMARY OF THE INVENTION

The present invention is directed to an improved electromagnetic measuring unit for use in making flow measurements in an extracorporeal circuit. The units are made into two separable parts which can be readily assembled made into two separable parts which can be readily assembled and disassembled. One part includes a tube with electrode sensors which may be made inexpensive enough to utilize it as a disposable part, or a paert which can be readily and easily changed and sterilized by conventional techniques. The other part of the assembly includes a magnet structure for generating the required magnetic field. The two parts can be easily assembled and disassembled and include quick disconnect electrical connections for the electrodes. The same magnet structure can be used in combination with tubular units of different sizes. By using a plurality of tubular parts in an extracorporeal circuit, measurements can be made at different points in the circuit by moving the magnet structure part from one tubular part to another.

This is accomplished, in brief, by a flow meter device having a tubular member made of nonmagnetic material adapted to be connected at either end into an extracorporeal blood flow line, such as used to connect an artifical heart and lung machine into a patient's circulatory system. The tubular member includes a central portion in which a set of electrodes extending through the walls of the tube are mounted in a common transverse plane. The central portion is surrounded by a rectangular shaped central block. Electrodes are brought out at one side of the central block to form a plurality of male plug terminals. The magnet structure includes a C-shaped magnetic core and a coil winding on the core. Parallel guide members extend along the outer ends of the core, the central block portion of the tubular member slidably engaging the guide members to hold the tubular member in fixed position within the magnetic field between the poles of the magnet. A female terminal connector mounted on the inside of the magnet structure receives the male plug terminals of the tubular member when the unit is assembled. In a modification of the invention a single magnet structure is used to provide two flowmeters by incorporating two removable tubular members positioned within the same C-shaped electromagnet.

DESCRIPTION OF THE DRAWINGS

For a more complete understanding of the invention reference should be made to the accompanying drawings, wherein:

FIG. 1 is a perspective view of the flow meter in disassembled condition;

FIG. 2 is a plan view partly in section of the flow meter;

FIG. 3 is a sectional view taken substantially on the line 3—3 of FIG. 2;

FIG. 4 is an end view of the sensor portion with a larger diameter tubular member;

FIG. 5 is a side view of the magnet portion of the flow meter;

FIG. 6 is an end view of the magnet portion; and

FIG. 7 is an alternative embodiment of the present invention;

DETAILED DESCRIPTION

Figure 8:
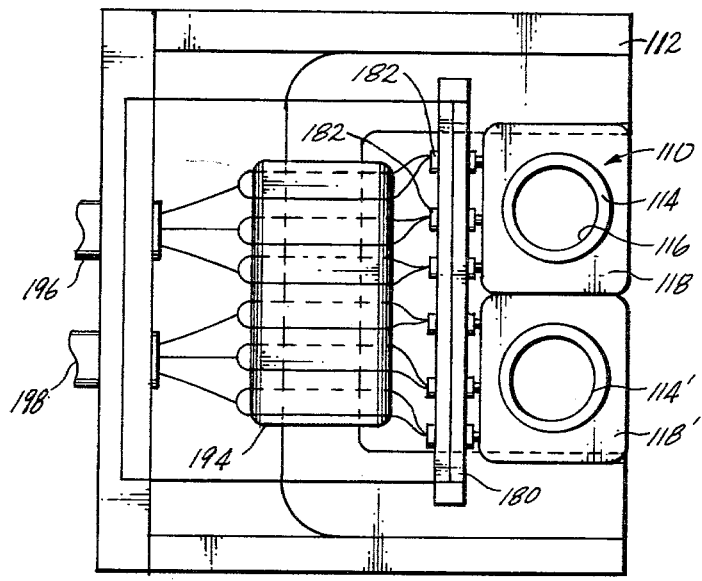
FIG. 8 is a side elevational view of a modified arrangement with the pair of lumens using a common magnetic field.

Referring to FIG. 1, the flow meter sensor assembly comprises two separable parts, a replaceable tubular sensor member 10, and a magnet member 12. Details of the sensor member 10 are shown in FIGS. 2, 3, and 4, and details of the magnet structure 12 are shown in FIGS. 5 and 6. Sensor member 10 is designed to slidably engage and electrically plug into the magnet member 12, permitting the sensor member, which is relatively inexpensive, to be made disposable or easily removable to provide sterilization. The sensor member 10 includes a tubular member 14 having a constant diameter bore 16 providing a fluid passage therethrough. The outer ends of the tubular member 14 are tapered so as to be insertable into plastic tubing. The outer perimeter of a central section 18 of the tubular member 14 is square in cross-section and extends between a pair of spaced flange portions 20 and 22. The central section 18, which therefore takes the form of a block, with the bore 16 providing an opening therethrough, has four flat surfaces 24, 26, 28, and 30 which terminate in shoulders formed by the flange portions 20 and 22. The tubular member 14 preferably is injection molded in a single piece from suitable plastic material, such as Lexan.

Axially aligned holes 32 and 34 extend through the walls of the tubular portion at the center of the surfaces 30 and 26, respectively. The third hole 36 extends at right angles to the axis of the holes 32 and 34 through the center of the surface 24. The holes 32, 34, and 36 lie in a common transverse plant. Three electrodes 38, 40, and 42 are provided having ends which are inserted in the respective holes 32, 34, and 36 and terminate flush with the inner surface of the bore 16. The electrode 38 extends outwardly perpendicular to the surface 30 to form an electrical connector or first male plug or pin 43. The electrode 38 has a flange 44 which engages the surface 30 to position the electrode axially and to provide an additional surface for cementing the electrode in position.

The electrode 40 is J-shaped to provide an end portion extending through the hole 34, a portion terminating in a connector plug or pin 45 extending along and projecting beyond the surface 28, and a transverse portion extending along the surface 26. The electrode 42 is L-shaped providing a portion extending into the hole 36 and a portion terminating in a connector plug or pin 47 extending along and projecting beyond the surface 24. The electrodes are preferably made of stainless steel and plated with gold to form a noncorrosive low resistance contact with the fluid being measured.

The electrodes 40 and 42 are locked in place by a back plate 46, and by top and bottom plates 48 and 50. The back plate 46, which has a width corresponding to the distance between the shoulders formed by the flanges 20 and 22, is cemented to the surface 26 of the tubular member 14. The plate 46 has a groove 52 which receives the portion of electrode 40 extending along the surface 26, thereby securely locking the electrode 40 in position in the hole 34. The upper plate 48 similarly has a groove 54 for receiving the electrode 42. The upper plate 48 also extends between the shoulders formed by the flanges 20 and 22 and is cemented or otherwise secured to the surface 24, thereby locking the electrode 42 in position. The bottom plate 50 is provided with a groove 56 which receives the electrode 40. The bottom plate 50 is cemented or otherwise attached to the surface 28.

The ends of the plate 46 and the outer surfaces of the upper and lower plates 48 and 50 form a continuous guide surface, as indicated at 58 and 60, respectively. The guide surfaces 58 and 60 terminate at either end in projecting guide ridges 62, 64, 66, and 68. The ridges 64 and 68 are made higher than the ridges 62 and 66 to provide a keying effect so that the sensor section can only be inserted in one way into the magnet section.

Referring to FIG. 4 there is shown an end view of a sensor section having a bore of larger diameter. The top, bottom, and side plates are made thinner so that the outer dimensions of the sensor section remain the same while the tubular member 14 is made relatively larger. This results in the terminal ends of the electrodes being more widely spaced than in the smaller diameter unit described in connection with FIGS. 2 and 3. Otherwise the assembly of the sensor member of FIG. 4 is substantially identical to that of FIGS. 2 and 3.

Referring to FIGS. 5 and 6, the magnet section of the fluid flow meter is shown in detail. The magnet structure includes a C-shaped magnetic core having a pair of parallel end portions or legs 72 and 74 forming the poles of the magnet structure and a center connecting portion 76. The core is preferably made of laminated silicon steel and is substantially square in cross section. A coil or winding 78 is wound on the central section 76 of the core 70. The spacing or gap between the inner surfaces of the legs 72 and 74 of the core corresponds to the distance between the guide surfaces 58 and 60 of the sensor member, while the width of the core corresponds to the distance between the guide ridges 62, 64, and 66, 68. Thus the magnetic core 70 is adapted to slidably engage the central section of the sensor member 10.

An H-shaped pin socket plate 80 extends between the legs 72 and 74 of the core, spanning the space between the legs. A plurality of female sockets are mounted on the plate 80, including a socket 82 at the center adapted to receive a plug end 43 of the electrode 38. Two groups of three sockets each, indicated at 84 and 86, are adapted to receive the plug ends 45 and 47 of the electrodes 40 and 42. The three sockets in each group are provided to accommodate the differences in electrode spacing resulting from different tubular sizes of the sensor section, there being typically three different sizes, corresponding to FIG. 3 and FIG. 4, and to an intermediate size.

The magnet and coil are enclosed in a top plate 88, bottom plate 90, and end plate 92 which preferably are made of molded plastic. A pair of side plates 94 and 96 are positioned on either side of the coil. The top and bottom plates 88 and 90 form guide members and provide guide surfaces 100 and 102 on either side of the leg 72 of the core 70 which are offset by differing amounts from the inner surface of the core so as to accommodate the guide ridges 62 and 64 of the sensor section. The plates are cemented together to provide a unitary structure.

Because the leads from the electrical connections are positioned in the magnetic field of the magnet, the internal electrical connections from the socket 82 and socket groups 84 and 86, respectively are in the form of twisted conductor pairs 87 extending from the socket terminals toward the coil 70. The two conductors of each pair are brought out around either side of the coil and reconnected as a pair to leads in shield cable 104. The magnet leads may be brought out through the same cable but are separately shielded. The twisted pair of conductors are carefully positioned in a common plane on both sides of the coil so that no magnetic lines of flux link the conductors to induce net currents in the conductors by induction. This is essential to reduce "noise" in the electrode output leads that could swamp out the low level signal from the electrodes.

The cable 104 connects to a conventional electromagnetic flow instrument (not shown) such as the flow meter instruments presently available on the market. The signal voltage is measured between the opposing electrodes 38 and 40 while electrode 42 is connected to ground.

While the electrode connections are preferably made from the tubular member to terminate on the inside of the magnet member, an alternative arrangement is shown in FIG. 7. Here the tubular member 10 engages the magnet member 12 in the same manner but is rotated through 180° so that the electrode terminal plug ends project away from the magnet core. A separate socket connector 106 and shield cable 108 are used to complete electrical connections between the electrodes and the measuring instrument. Otherwise the construction of FIG. 7 is substantially identical to that of FIG. 1.

Figure 9:
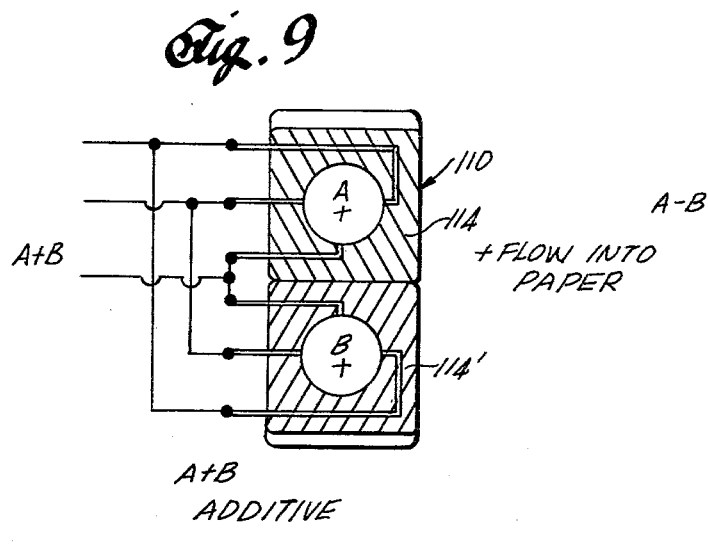
FIGS. 9 and 10 show two alternative wiring arrangements for the double lumen arrangement of FIG. 8.
Figure 10:
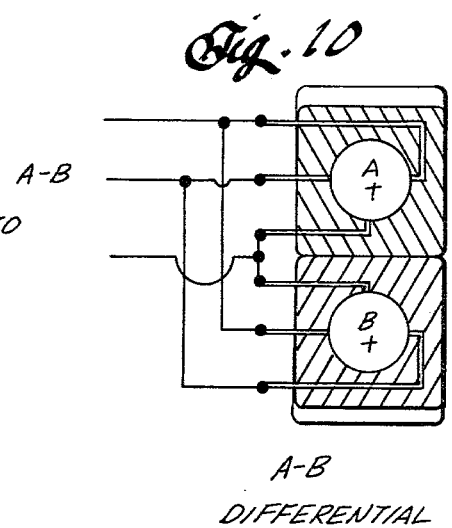

In an alternative arrangement shown in FIGS. 8, 9, and 10, a single magnet member 112 receives a dual tubular sensor assembly 110. The magnet member is similar to that described above in connection with FIGS. 1, 5, and 6, except that the open space between the poles of the magnet core are made wider to accommodate the dual tubular sensor assembly 110. The dual tubular sensor assembly 110 includes a pair of tubular members 114 and 114'. Tubular members 114 and 114' have a constant diameter bore 116. Outer central portions 118 and 118' are rectangular in cross section with flat outer surfaces. Adjacent surfaces of the two central portions are preferably cemented or otherwise secured together to form the unitary non-conductive body. Opposite outer surfaces preferably slidably engage the pole faces of the magnet in the same manner as the single tubular arrangement described above. Each tubular member 114 and 114' includes three electrodes which are arranged in the same manner as described above in connection with FIGS. 3 and 4. A socket plate 180 has six female sockets 182 arranged to receive the ends of the electrodes to permit removal of the dual sensor assembly 110. Six pair of electrical leads 184 extend from the sockets around either side of the electromagnet 194 to a pair of output cables 196 and 198.

As shown in FIGS. 9 and 10, the two tubular members and associated electrodes can be wired to provide a measure of the combined flow through the tubular members or a measure of the difference in flow. FIG. 9 shows the wiring arrangement for measuring the combined or additive flow rate and FIG. 10 shows the wiring arrangement for measuring the difference in flow rates.

From the above description it will be seen that a sensor assembly is provided for making extracorporeal blood flow measurements or the like which is arranged in two separable sections, one section providing the blood flow passage and associated sensor electrodes, and the other section including the electromagnet for producing the required magnetic field. The two sections provide mechanical as well as electrical connections between the two sections, permitting the magnet section to be used interchangeably with a plurality of electrode sensor sections. The electrode sections are relatively inexpensive compared to the magnet sections and therefore can be used as a disposable item or an easily replaceable item. This arrangement also permits substitution of electrode sensor sections accommodating different tube diameter sizes to be used with the same magnet structure.

What is claimed is:

1. A liquid flow meter device comprising a disposable sensor section including a tubular member made of nonmagnetic material adapted to be connected into a fluid flow line, and a pair of electrodes extending through the wall of the tubular member and terminating on the inner surface at diametrically opposite points in a common transverse plane, and an electromagnetic section including a C-shaped core forming a pair of opposing poles with a gap between the poles and a winding on the core, a multiple terminal connector having a female receptor section and a male plug section, one of said connector sections being integral with the sensor section in the region of said electrodes, and the other section being mounted adjacent the gap between the poles of the C-shaped core, the two sections of the connector engaging each other by inserting the plug section into the receptor section to complete electrical and mechanical connections between the disposable sensor section and the electromagnetic section when the sensor section is moved into the gap between the poles of the core in a direction transverse to the central part of the core, and means in the sensor section for electrically connecting the electrodes to the terminals of the connector section integral with the tubular member.

2. The apparatus of claim 1 wherein the inner ends of the electrodes lie in a plane extending perpendicular to the flux lines extending between the poles of the core when the winding is energized.

3. Apparatus of claim 1 wherein the electromagnetic section includes a pair of parallel guide means extending along the legs of the C-shaped core, and the tubular member includes mating guide means slidably engaging said parallel guide means to hold the tubular member in position when the sensor section is inserted between the poles of the electromagnetic section.

4. Apparatus of claim 1 wherein the electrodes have integral parallel portions forming the male connector section and adapted to directly engage the female receptor section when the sensor section is mounted in position.

5. Apparatus of claim 1 wherein the electromagnetic section includes pairs of conductors connected to the terminals of said other connector section, the pairs of conductors extending from the respective terminals around the winding to an output cable, the conductors of each pair being twisted together between the terminals and winding and passing separately around opposite sides of the winding.

6. Apparatus of claim 1 wherein the disposable sensor section includes a second tubular member extending parallel to said first mentioned tubular member, a pair of electrodes extending through the wall of the second tubular member and terminating at diametrically opposite points in said common transverse plane.

7. The apparatus of claim 1 wherein the disposable sensor section includes keying means limiting the sensor section to only one insertion position in the electromagnetic section.

8. A flow meter assembly comprising first and second separable sections, the first section including a C-shaped magnetic core having parallel end portions and a central transverse portion, a coil wound on the transverse portion, and an electrical terminal connector supported from the core, the second section including a tubular member, a pair of electrodes extending into the tubular member at diametrically opposite points of the tubular member, guide means slidably engaging the end portions of the magnetic core for guiding and supporting the tubular member in position between the ends of the C-shaped core, the guide means when engaging the ends of the core holding the axis of the tubular member and the diametrical axis of the ends of the electrodes in mutually perpendicular position relative to the flux path between the ends of the core when the coil is energized, and an electrical terminal means connected to the electrodes for engaging said electrical terminal connector to complete electrical connections to the electrodes when the second section is inserted between the end portions of the core.

9. The apparatus of claim 8 wherein the electrodes include portions extending parallel to each other in a common plane parallel to the flux path between the ends of the core, the ends of said electrode portions forming plug terminals directly insertable into the electrical terminal connector of the first section.

10. The apparatus of claim 9 further including a third electrode extending into the tubular member at a point between said pair of electrodes, the third electrode lying in said common transverse plane with the pair of electrodes and having an end portion forming a terminal directly insertable in the electrical connector of the first section.

11. Apparatus of claim 8 wherein the second section includes a second tubular member extending parallel and integral with the first-mentioned tubular member, a pair of electrodes extending into the second tubular member at diametrically opposite points, the longitudinal axis of the two tubular members lying in a common plane, the guide means holding the axis of the second tubular member and the diametrical axis of the ends of the electrodes in mutually perpendicular position relative to the flux path between the ends of the core when the coil is energized, the flux extending parallel to said common plane of the axis of the two tubular members.

12. A flow meter assembly comprising first and second separable sections, the first section including a C-shaped magnetic core having parallel end portions and a central transverse portion, and a coil wound on the transverse portion, the second section including a tubular member, a pair of electrodes extending into the tubular member at diametrically opposite points of the tubular member, guide means slidably engaging the end portions of the magnetic core for guiding and supporting the tubular member in position between the ends of the C-shaped core, the guide means when engaging the ends of the core holding the axis of the tubular member and the diametrical axis of the ends of the electrodes in mutually perpendicular position relative to the flux path between the ends of the core when the coil is energized, the electrodes including portions extending parallel to each other in a common plane parallel to the flux path between the ends of the core, the ends of said electrode portions forming terminals projecting from one side of the second section, and electrical connector means for engaging the terminals to provide external electrical connections to the electrodes.

13. Apparatus of claim 12 wherein said terminals extend away from the coil when the two sections are assembled.

14. Apparatus of claim 12 wherein said terminals extend toward the coil when the two sections are assembled, the connector means being mounted on the first section between said end portions of the core for engaging the terminals.

15. Apparatus of claim 14 further including pairs of conductors joined to and extending from each terminal of the connector means past the coil and away from the coil, the conductors forming each pair extending on opposite sides of the coil.

16. A replaceable sensor assembly for a magnetic flow meter of the type using a magnet structure for producing a magnetic field between a pair of spaced poles between which the fluid is directed, comprising a non-conductive body having a pair of spaced parallel passages extending through the body, the body being shaped to slidably engage the magnet structure between the poles, two groups of three electrodes lying in a common plane extending perpendicular to said passages, the electrodes of each group intersecting respective ones of said passages at three spaced points around the circumference of the associated passage, with two of the electrodes intersecting the passage opposite each other along a line.

17. The sensor assembly of claim 16 wherein the body includes keying means limiting the sensor assembly to only one insertion position in the magnet structure.

18. A replaceable sensor assembly for a magnetic fluid flow measuring instrument comprising a tubular portion forming a fluid flow passage and a mounting portion surrounding the tubular portion, the mounting portion having a pair of spaced parallel longitudinal guide surfaces extending perpendicular to and on either side of the axes of the tubular portion for guiding the assembly into position in the magnet structure of measuring instrument, and three conductive electrodes having ends terminating in the tubular portion and exposed to fluid passing therethrough, said ends lying in a common plane transverse to the axis of the tubular portion, two of said ends being positioned opposite each other along a common axis extending parallel to the longitudinal guide surfaces and the third end being in a position intermediate said two ends, said electrodes having terminal ends projecting outside the mounting portion in parallel relationship to each other in direction parallel to said longitudinal guide surfaces, to form an electrical connector.

19. The sensor assembly of claim 18 wherein the mounting portion includes means for keying the sensor assembly so that the sensor assembly can be positioned in the magnet structure in only one way.

20. A flow meter assembly comprising first and second separable sections, the first section including a C-shaped magnetic core having parallel end portions and a central transverse portion, and a coil wound on the transverse portion, the second section including a pair of tubular members, a pair of electrodes extending into each of the tubular members at diametrically opposite points of the tubular members, guide means slidably engaging the end portions of the magnetic core for guiding and supporting the tubular members in position between the ends of the C-shaped core, the guide means when engaging the ends of the core holding the axis of each of the tubular members and the diametrical axis of the ends of the corresponding electrodes in mutually perpendicular position relative to the flux path between the ends of the core when the coil is energized, the electrodes including portions extending parallel to each other in a common plane parallel to the flux path between the ends of the core, the ends of said electrode portions forming terminals projecting from one side of the second section, and electrical connector means for engaging the terminals to provide external electrical connections to the electrodes.

21. The flow meter assembly of claim 20 wherein the second section includes means for keying the second section into the first section in only one way.

22. A replaceable sensor assembly for a magnetic flow meter of the type using a magnet structure for producing a magnetic field between a pair of spaced poles, comprising a block having an opening extending therethrough, and three conductive electrodes supported in said block in a common plane extending substantially perpendicular to the direction of the opening with one end of each electrode projecting outside the block in said plane to form three parallel connector pins, the other end of the middle one of the three electrodes intersecting the opening at a first point, one of the outer two electrodes being bent such that the other end of the electrode intersects the opening at a point on the opposite side of the opening and in alignment with the first electrode, the other of the outer two electrodes being bent such that the other end of the electrode intersects the opening at a point on the periphery of the opening that is intermediate the intersecting points of the other two electrodes; and wherein the block has elongated guide surfaces adapted to slidably engage the magnet structure, the guide surfaces extending parallel to the connector pins on opposite margins of the block for guiding the block and associated pins into and out of a terminal engaging position in the magnet structure.

23. Apparatus of claim 22 further including tubular means projecting from the block in alignment with said opening for passing fluid through the opening.

24. Apparatus of claim 22 wherein said opening in the block is cylindrical, the axis of the cylinder being perpendicular to the plane of the electrodes, the ends of two of the electrodes intersecting the cylindrical opening at diametrically opposite points and the third electrode intersecting the cylindrical opening along a diameter perpendicular to the diameter extending between said diametrically opposite points.

25. Apparatus of claim 22 wherein said guide surfaces of the block extend substantially parallel to each other and in a direction perpendicular to the central axis of the opening.

26. A replaceable sensor assembly for a magnetic flow meter of the type using a magnet structure for producing a magnetic field between a pair of spaced poles, comprising a block having an opening extending therethrough, and three conductive electrodes supported in said block in a common plane extending substantially perpendicular to the direction of the opening with one end of each electrode projecting outside the block in said plane to form three parallel connector pins, the other end of the middle one of the three electrodes intersecting the opening at a first point, one of the outer two electrodes being bent such that the other end of the electrode intersects the opening at a point on the opposite side of the opening and in alignment with the first electrode, the other of the outer two electrodes being bent such that the other end of the electrode intersects the opening at a point on the periphery of the opening that is intermediate the intersecting points of the other two electrodes; and further including a second opening through the block parallel to the first opening, and a second group of three electrodes mounted in the block intersecting the second opening respectively on opposite sides of the second opening and at an intermediate point of the second opening.

27. Apparatus of claim 26 further including a pair of tubular means projecting from the block in alignment respectively with the two openings for passing fluid through each of the openings.

28. A replaceable sensor assembly for a magnetic flow meter of the type using a magnet structure for producing a magnetic field between a pair of spaced poles, comprising a block having an opening extending therethrough, and three conductive electrodes supported in said block in a common plane extending substantially perpendicular to the direction of the opening with one end of each electrode projecting outside the block in said plane to form three parallel connector pins, the other end of the middle one of the three electrodes intersecting the opening at a first point, one of the outer two electrodes being bent such that the other end of the electrode intersects the opening at a point on the opposite side of the opening and in alignment with the first electrode, the other of the outer two electrodes being bent such that the other end of the electrode intersects the opening at a point on the periphery of the opening that is intermediate the intersecting points of the other two electrodes; and wherein the block includes keying means limiting the sensor assembly to a single orientation between the spaced poles.

* * * * *

UNITED STATES PATENT AND TRADEMARK OFFICE
CERTIFICATE OF CORRECTION

PATENT NO. : 4,195,515
DATED : April 1, 1980
INVENTOR(S) : Owen C. Smoll

It is certified that error appears in the above-identified patent and that said Letters Patent are hereby corrected as shown below:

Column 1, line 52, delete "made into two separable parts which can be readily assembled";
line 56, "Paert" should be --part--;
line 56, "changed" should be --cleaned--.

Column 2, line 2, "artifical" should be --artificial--.

Column 3, line 9, "plant" should be --plane--.

Column 4, line 45, "pair" should be --pairs--.

Column 5, line 14, "the" should be --a--.

Signed and Sealed this

Eighteenth Day of November 1980

[SEAL]

Attest:

SIDNEY A. DIAMOND

Attesting Officer

Commissioner of Patents and Trademarks